Dec. 31, 1957   P. C. VOGEL   2,817,883
MACHINE FOR MAKING MOLDS
Filed Aug. 15, 1956   2 Sheets-Sheet 1

Inventor
Paul C. Vogel
by Arthur M. Streich
Attorney

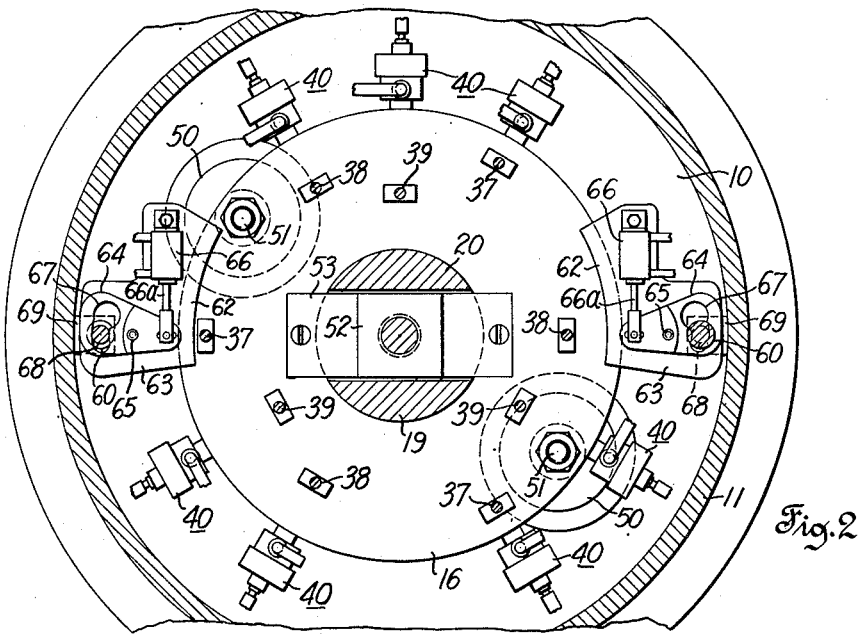

United States Patent Office 2,817,883
Patented Dec. 31, 1957

2,817,883
MACHINE FOR MAKING MOLDS

Paul C. Vogel, Milwaukee, Wis., assignor to Allis-Chalmers Manufacturing Company, Milwaukee, Wis.

Application August 15, 1956, Serial No. 604,224

3 Claims. (Cl. 22—54)

This invention relates generally to an apparatus for making molds for wheels such as pulleys, flywheels or the like and more particularly relates to a machine which will be capable of adjustment to make molds for wheels of various sizes.

Machines presently known to this art for making molds for wheels such as pulleys and flywheels, usually provide a generally horizontal surface made up in part of a cylinder placed on end with its cylindrical axis in a vertical position. A centerpiece having an outer diameter corresponding to the inner diameter of the cylinder is placed within the upper open end of the cylinder. A plate having a hole in it corresponding to the outer diameter of the cylinder is placed over the upper end of the cylinder. The plate, the end of the cylinder and the centerpiece within the cylinder provide a flush horizontal table surface. Pattern elements for a hub and spokes are placed on the table with the hub pattern axis coinciding with the central axis of the cylinder. A flask is then placed on the table surface with wall portions of the flask surrounding a considerable area around the cylinder. The cylinder is raised endwise to project above the table surface by means of one or more air motors. The cylinder thereby projects above the table surface and into the space enclosed by the flask, to provide the pattern for the rim of a wheel. Molding sand is then rammed into the flask around the pattern elements. When the flask is completely filled with rammed sand, the cylinder is withdrawn from the sand back to its initial position in which the end of the cylinder is flush with the surface of the centerpiece and plate. This cylinder, which is the pattern for the rim, is withdrawn downwardly from the mold before the mold is lifted off the table surface in order to be sure that the pattern for the rim will be removed cleanly from the mold without breaking corners of the mold.

When the above described machine is used to make molds for wheels of a different size than the machine had been set up for, it is necessary to disassemble the machine and reassemble the machine with a different size cylinder, centerpiece and plate. The cost of making molds with such a machine must reflect the labor and time of an operator that is necessary for the operator to take the machine apart and reassemble it with other parts for molds for different size wheels. Furthermore, to use such a machine for production of molds for various size wheels it is necessary to purchase and stock a number of different size cylinders, centerpieces and plates.

Modifications of the above described machine are also well known in this art. One modification is a machine in which a nest of concentrically arranged cylinders is placed with their central axis in a vertical position. The end portions of the cylinders form part of a table surface. In this machine a hand operated radially movable crank mechanism is provided beneath the cylinders for jacking up one of the cylinders to project above the table surface. Such a machine is not completely satisfactory because the hand cranking operation is slow, only one cylinder at a time can be raised and held in the elevated position, and at times cylinders adjacent the cylinder being cranked upwardly may be partially raised when it is not so desired because of the frictional contact with the cylinder that is being raised.

The nature of the present invention resides in improvements to the type of machine having a nest of concentrically arranged cylinders. According to the present invention connectors which may be fluid pressure operated motors are provided and arranged to rapidly connect selected cylinders to means for lifting such cylinders to project them above the table surface and into a space enclosed by a mold flask and further the nonselected cylinders are held by connectors that connect these cylinders to stationary structures to prevent their being raised to project above the table surface as a result of frictional contact with adjacent cylinders. Accordingly, it is a principal object of the present invention to provide a machine which can be used for making molds for such as pulleys, flywheels and the like that have various diameters and that the machine can be selectively and rapidly adjusted to varied requirements.

Another object of the present invention is to provide means for holding cylinders that are selected to be raised to prevent their being raised by the frictional contact with upwardly moving cylinders.

Another object of the present invention is to provide means for lifting each cylinder, that may be operated simultaneously to raise more than one of the cylinders and thereby provide a pattern for a mold for wheels having rim portions of various thicknesses.

Another object of the present invention is to provide the machine with improved means for rapidly stripping or pulling the one or a group of cylinders downwardly out of the mold so as to withdraw these pattern elements cleanly from the packed sand within the mold before the mold is moved and avoid breaking any of the corner surfaces formed by the cylinders within the mold.

And another object of the present invention is to provide means engageable with the cylinder lifting means when desired for lifting the flask and mold above the table surface of the machine and above the hub and spoke pattern elements so that the entire mold may be picked up by a crane or other materials handling device and carried away with minimum danger of the mold being broken by bumping against the table surface or pattern elements.

Objects and advantages other than those above set forth will be apparent as the description of the invention proceeds.

The novel features of the invention and how the objects are attained will appear from the specification and the accompanying drawing showing an embodiment of the invention and all of these features are intended to be pointed out in the claims.

In the drawings:

Fig. 2 is a sectional view of the machine taken along the line II—II in Fig. 1 and viewing the machine in the direction indicated by the arrows; and Figs. 3, 4, 5 and 6 illustrate steps of operating the present machine to make a mold.

Figure 1:
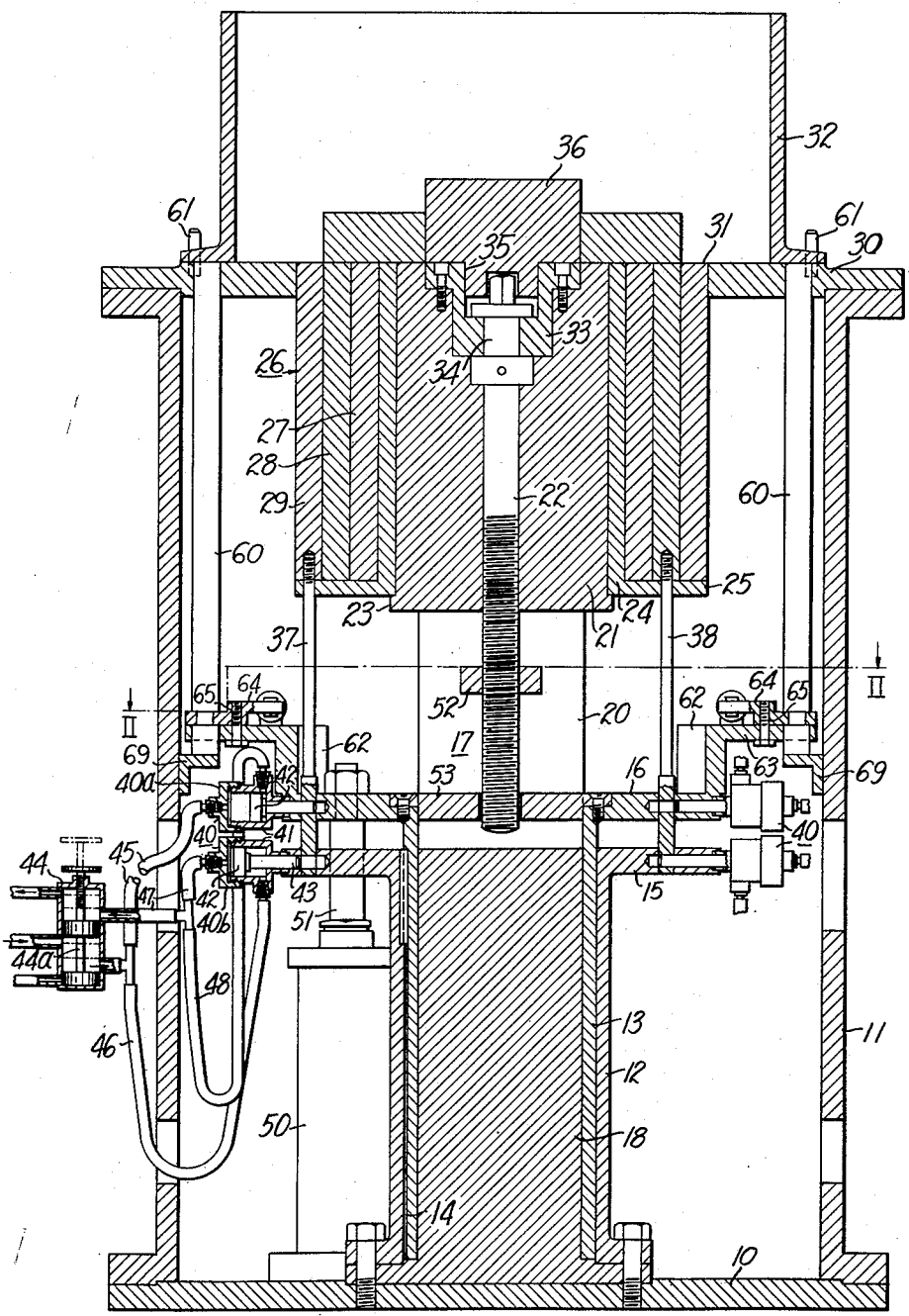
Fig. 1 is a sectional view of a mold making machine embodying the present invention.

Referring in particular to Figs. 1 and 2 of the drawings the machine is shown as having a frame made up of a base plate 10 and wall structure 11. A cylinder 12 within the wall structure 11 is secured to the base plate 10. A second cylinder 13 is fitted within cylinder 12. A spline 14 prevents rotation of cylinder 13 relative to cylinder 12 but does permit axial movement of cylinder 13 relative to cylinder 12 and the base plate 10. Each of the cylinders 12 and 13 is provided with annular collars 15, 16, respectively, projecting radially outward from the cylinders. A center post 17 is provided having three principal portions, a lower portion 18 fitted within cylinder 13 and secured to base plate 10, a center portion having a slot cut therethrough to provide two spaced wall portions 19 and 20 (see Fig. 2), and an upper portion 21. The upper portion 21 is provided with a collar 23 projecting radially outward from the center post structure. A sleeve 24 is fitted about the upper cylinder of the center post and rests upon collar 23. Sleeve 24 is provided with an annular collar 25 projecting radially outward from the sleeve 24. A nest 26 of concentrically arranged cylinders 27, 28, 29 is fitted around the upper portion 21 of the center post and these cylinders rest upon the annular collar 25. An arbitrary number of three cylinders have been chosen to illustrate the present invention. A collar plate 30 is fitted about the outer cylinder 29 and is supported by the outer wall structure 11. The collar plate 30, the nest of concentric cylinders 26 and the top of the upper portion 21 of the center post 17, provide a flush work surface 31. A flask 32 is placed on the surface 31 surrounding the nest of cylinders 26.

The top of the upper portion 21 of post 17 is counterbored and an insert 33 placed therein so that a threaded rod 22, having a function hereinafter described, is entirely beneath the top surface of the upper cylinder 21. This has an additional advantage in that an end portion 34 of the rod 22 cooperates with a wall surface 35 of the insert 30 to provide a means for centering a hub pattern 36 on the table surface 31.

Means for raising one or more of the nested cylinders 27, 28 or 29 relative to the collar plate 30 and relative to other cylinders in the nest, may include as shown a group of rods 37, a group of rods 38 and a group of rods 39, each group of rods being provided for lifting one of the cylinders of the nest 26. For purposes of explaining this invention an arbitrary number of three rods has been chosen to illustrate the means for lifting each of the cylinders of the nest 26. Rods 37 are threaded into the lower end portion of cylinder 29. Rods 38 are threaded into the bottom end portion of the cylinder 28 and rods 39 shown only in Fig. 2 are likewise provided for lifting cylinder 27.

The ends of all of the rods 37, 38 and 39 remote from the cylinders 27, 28 and 29 each pass through both of the collars 15 and 16. A plurality of air motors 40 are provided around the periphery of both of the collars 15 and 16. One air motor is provided on each of the collars 15 and 16 for each of the rods in the groups 37, 38 and 39. The air motors 40 permit the rods 37, 38 and 39 to be selectively secured to one or the other of the collars 15 or 16. To raise one of the cylinders in the nest 26, each of the rods that are connected on their upper ends to the cylinder that is to be lifted is on its lower end connected to the collar 16. The rods which are connected on their upper ends to a cylinder which is not to be raised are connected on their lower ends to collar 15 to hold them down and prevent their being carried upwardly by frictional contact with an adjacent cylinder that is being raised.

The operation of the air motors 40 can be described with particular reference to two of the motors 40a and 40b that operate with one of the rods 37 and are shown in section in Fig. 1. Each of the motors comprises a cylinder 41 and a piston 42 mounted within cylinder 41. A peg 43 projects radially inward from the piston 42 and extends through the end wall of the cylinder 41. A pressure fluid such as air is selectively delivered to or exhausted from one or the other of the two sides of pistons 42 under the control of means which may be a hand operated valve 44 as shown. Valve 44 in the position shown delivers operating pressure fluid to the left hand side of the piston of motor 40a through a tube 45 which is also connected by a flexible tube 46 to the right hand side of the piston of motor 40b. Valve 44 in this position drains fluid pressure from the left side of the piston in motor 40b through a tube 47 and drains fluid pressure from the right side of the piston in motor 40a through a tube 48 that is connected to tube 47. Thus the piston in motor 40a will be moved to the right side as shown to pin a rod 37 to collar 16 and the piston in motor 40b will be moved to the left to disconnect this rod from collar 15. When cylinder 13 and collar 16 are raised relative to cylinder 12 and collar 15 by means hereinafter described the rods 37 and cylinder 29 will move upwardly and cylinder 29 will project above the table surface 31. To disconnect the rods 37 from collar 16 and connect them to collar 15 so they will not move upwardly with collar 16 the operation of motors 40a and 40b is reversed. This may be accomplished by moving an element 44a within valve 44 from the position shown in solid lines to the position shown in broken lines to connect tube 47 to the source of fluid pressure and at the same time connect tube 45 to drain. By positioning the valve element 44a in a valve 44 for each pair of motors 40 associated with a rod in groups 37, 38 and 39 in either of the two positions shown, an operator may select any cylinder or cylinders of nest 26 that he desires to be raised with collar 16 and cylinder 13 and the nonselected cylinders will remain held in the lower position by collar 15 and cylinder 12.

Means for lifting cylinder 13 and collar 16 relative to cylinder 12 and collar 15 may be, as shown, one or more of air motors 50. The motor 50 includes a rod 51 that passes through collar 15 and is secured to collar 16. Thus actuation of motor 50 to move the rod 51 upwardly (by means not shown) raises collar 16 and cylinder 13 relative to cylinder 12 and collar 15. An adjustable upper limit to the travel of collar 16 and cylinder 13 is provided and may comprise a nut 52 threadingly engaging the rod 22 at some point intermediate its end portions beneath the collar 23 and above the collar 16. An arm 53 with a hole in it is secured to the collar 16 across the central opening through collar 16. As cylinder 13, collar 16 and the arm 53 move upwardly the arm 53 will engage the nut 52 and prevent further upward movement of these members.

Means provided to lift flask 32 above the work surface 31 of the machine may include as shown a pair of push rods 60. Pins 61 removably fitted in the work surface 31 are arranged to pass through holes in a lower flange portion of the flask 32 so that the flask may be aligned properly on the surface 31. The rods 60 engage the flask 32 to push the flask upwardly relative to the work surface 31 in a manner that will appear from following description. The lower ends of the rods 60 may be selectively connected to or disconnected from the collar 16. When the rods 60 are not connected to collar 16 they each rest upon a bracket 69 attached to the wall structure 11. The means for connecting the rods 60 to the collar 16 are so constructed that they can be adjusted to cause the rod 60 to move upwardly with the collar 16 or to remain in the lower position as shown in Fig. 1 as the collar 16 moves upwardly. The connecting means include a wall section 62 projecting upwardly from the collar 16 and having a horizontal portion 63 projecting radially outward a distance sufficient to reach beyond the rods 60. The rods 60 pass through a hole in the horizontal portion 63. Means for latching the rod 60 to the horizontal portion 63 include a lever 64 pivotally secured to the horizontal portion 63 by a bolt 65. Motor 66 which may be similar in construction to the motors 40, has a piston 66a (see Fig. 2) connected to one end of the lever 64 to pivot the lever 64 about the bolt 65. The end of lever 64 remote of the motor 66 is engageable with the rods 60 so that the rods 60 can be moved upwardly with collar 16. Referring specifically to Fig. 2, a slot 67 is shown in lever 64 having one portion thereof corresponding to the outer diameter of the shaft 60 and a second portion being smaller than the outer diameter of the rod 60 so as to engage with a portion 68 of the rod 60 having a reduced diameter. The position of the lever 64 determines whether the rod 60 will pass freely through the larger portion of the slot 67 or whether the reduced diameter section 68 of the rod 60 will engage with the smaller portion of the slot 67 and thereby latch the rod 60 to collar 16 so as to lift the rod 60 when the collar 16 and cylinder 13 are raised.

The operation of the machine to make a mold will be described with additional reference to Figs. 3, 4, 5 and 6. To make a mold with the machine embodying the present invention the entire nest 26 of cylinders are lowered to their lowest position as shown in Fig. 3 by lowering cylinder 13 and the collar 16. This also causes the rods 60 to be in their lowered position. A hub pattern 36 is placed on the table and spoke patterns 71 are placed around the hub pattern as required. A flask 32 is then placed on the table surface 31 with the pins 61 projecting through holes in the flanges around the flask 32. One of the cylinders, shown in Fig. 4 as the cylinder 29, is then raised. This is accomplished by adjusting the various air motors 40 so that the air motors 40 carried by the collar 16 engage with the rods 37. The rods 38 and 39 will remain connected to the collar 15 by the motors 40 carried by collar 15. At this step of the operation it is not desired that the push rods 60 move upwardly. The levers 64 are therefore pivoted about the bolts 65 so that the largest portion of slot 67 is fitted around the push rod 60 and the rods 60 are then not connected to move with collar 16. To achieve the arrangement shown in Fig. 4, the motors 50 have raised cylinder 13, collar 16, rods 37 and cylinder 29 so that the cylinder 29 projects into the space enclosed by the flask 32.

The next step in the operation of the machine is to ram the entire flask 32 with molding sand and then cause the air motors 50 to lower cylinder 13, collar 16, rods 37 and cylinder 29 so that cylinder 29 will be stripped from the sand mold as shown in Fig. 5.

With the cylinders of nest 26 all in the lower position the motors 66 are then operated to pivot the lever 64 about the bolt 65 and cause the smaller portion of the slot 67 to slip around the portion 68 of the push rods 60 having a reduced diameter. In this way the push rods 60 are latched to the collar 16 and cylinder 13. The air motors 50 are then again operated so as to raise cylinder 13 and the collar 16. This time, however, with the push rods 60 latched to the collar 16 the push rods 60 will move upwardly with cylinder 13 and collar 16 and as shown in Fig. 6 the mold will be raised above the table surface 31 to permit lifting the mold off of the machine with a minimum danger of breaking the corners of the cavity defined within the mold. With the mold in the elevated position shown in Fig. 6 the entire flask and mold can be attached to a lift mechanism such as a crane and the push rods 60 and cylinder 29 then lowered to be out of the way when the flask and mold is moved away from the machine.

Modifications in the above described operation of the machine will be readily apparent. For example, if the operator of the machine does not wish the cylinder 29 to move upwardly with the push rods as shown in Fig. 6 it is merely necessary that the motors 40 be so adjusted that all of the rods 37, 38 and 39 are all secured to the collar 15 and none of the rods and their corresponding cylinders will then be raised when cylinder 13, collar 16 and push rods 60 are moved upwardly to lift the flask 32 off of the table. It will also be readily apparent that flywheels having relatively thick rim portions can be made with this machine by merely causing more than one of the cylinders of the nest 26 to move upwardly. Thus, by merely providing shorter spoke patterns from the hub pattern to the rim portion of the mold a flywheel of an entirely different configuration can be made with a minimum of effort and time utilized in adjusting the machine.

From the foregoing it will be apparent to those skilled in the art that the illustrated embodiment of the invention provides a new and improved machine for making molds. On the other hand it will also be obvious to those skilled in the art that the illustrated embodiment of the invention may be modified or features thereof embodied in other combinations than that illustrated without departing from the spirit of the invention or sacrifice all of the advantages thereof. Accordingly, the disclosure herein is illustrative only and the invention is not limited thereto.

What is claimed is:

1. A machine for making molds comprising a base, a vertically extending post mounted on said base, a nest of cylinders arranged with their central axis in a vertical position and supported by said post at a preselected elevation above the level of said base, upper end surfaces of said nested cylinders being arranged in horizontal alignment to define at least a part of a table surface, motive means movable between a first position and a second position at a higher elevation above said base than said first position, a stationary member connected to said base, first connecting means associated with said motive means and operable to connect said cylinders to said motive means, second connecting means associated with said stationary member and operable to connect said cylinders to said stationary member, and means for controlling the operation of said first and second connecting means, said control means being operable to simultaneously actuate said first connecting means to connect selected of said cylinders to said motive means and actuate said second connecting means to connect all other of said cylinders to said stationary member whereby movement of said motive means from said first position to said second position raises said selected cylinders to project above said table surface and all other cylinders are held to prevent their being raised by frictional contact with said selected cylinders.

2. A machine for making molds comprising a base, a vertically extending post mounted on said base, a nest of cylinders arranged with their central axis in a vertical position and supported by said post at a preselected elevation above the level of said base, upper end surfaces of said nested cylinders being arranged in horizontal alignment to define at least a part of a table surface, motive means movable between a first position and a second position at a higher elevation above said base than said first position, a stationary member connected to said base, a plurality of rods depending on each of said cylinders, a first plurality of connectors associated with said motive means and operable to attach said rods to said motive means, a second plurality of connectors associated with said stationary member and operable to attach said rods to said stationary member, and means for controlling the operation of said connectors, said control means being operable to actuate said connectors to attach said rods from selected cylinders to said motive means and to attach all other rods to said stationary member whereby movement of said motive means from said first position to said second position raises said selected cylinders to project above said table surface and all other cylinders are held to prevent their being raised by frictional contact with said selected cylinders.

3. A machine for making molds comprising a base, a vertically positioned center post mounted on said base, a nest of cylinders arranged concentrically about said center post and supported by said post at a preselected elevation above the level of said base, upper end surfaces of said nested cylinders being arranged in horizontal alignment to define at least a part of a table surface, a pair of cylinders concentrically arranged about said post below said nest of cylinders, the outer of said cylinders being secured to said base and the inner of said cylinders being movable vertically relative to said base, the inner of said pair of cylinders extending vertically above said outer cylinder, said inner cylinder of said pair having a first radially extending collar, said outer cylinder of said pair having a second radially extending collar disposed beneath said first collar, a fluid pressure operated motor connected to said first collar operative to move said first collar and said inner cylinder between a first position and a second position at a higher elevation above said base than said first position, a plurality of rods depending on each of said cylinders, a first plurality of fluid pressure operated motors attached to said first collar, said first plurality comprising one motor for each rod, each of said first plurality of motors having a movable peg operable to pin said rods to said first collar, a second plurality of fluid pressure operated motors attached to said second collar, said second plurality of motors comprising one motor for each rod, each of said second plurality of motors having a peg operable to pin said rods to said second collar, each rod thereby being associated with a pair of motors, one motor of said pair being of said first plurality and the other of said second plurality, and a plurality of valves comprising one valve for each of said pairs of motors for controlling operating fluid pressure for said valves, said valves being operable to actuate said pairs of motors to pin rods from selected cylinders to said first collar and to pin all other rods to said second collar whereby movement of said first collar and said inner cylinder from said first position to said second position raises said selected cylinders to project above said table surface and all other cylinders are held to prevent their being raised by frictional contact with said selected cylinders.

References Cited in the file of this patent

UNITED STATES PATENTS

| | | |
|---|---|---|
| 418,523 | Laissle | Dec. 31, 1889 |
| 542,304 | Donovan | July 9, 1895 |
| 913,126 | Griffith | Feb. 23, 1909 |

FOREIGN PATENTS

| | | |
|---|---|---|
| 91,678 | Germany | May 19, 1897 |
| 119,066 | Germany | Mar. 25, 1901 |
| 409,390 | France | Feb. 17, 1910 |